No. 848,280. PATENTED MAR. 26, 1907.
F. A. BECKWITH.
AUTOMATIC TEMPERATURE REGULATOR.
APPLICATION FILED AUG. 25, 1906.
5 SHEETS—SHEET 1.
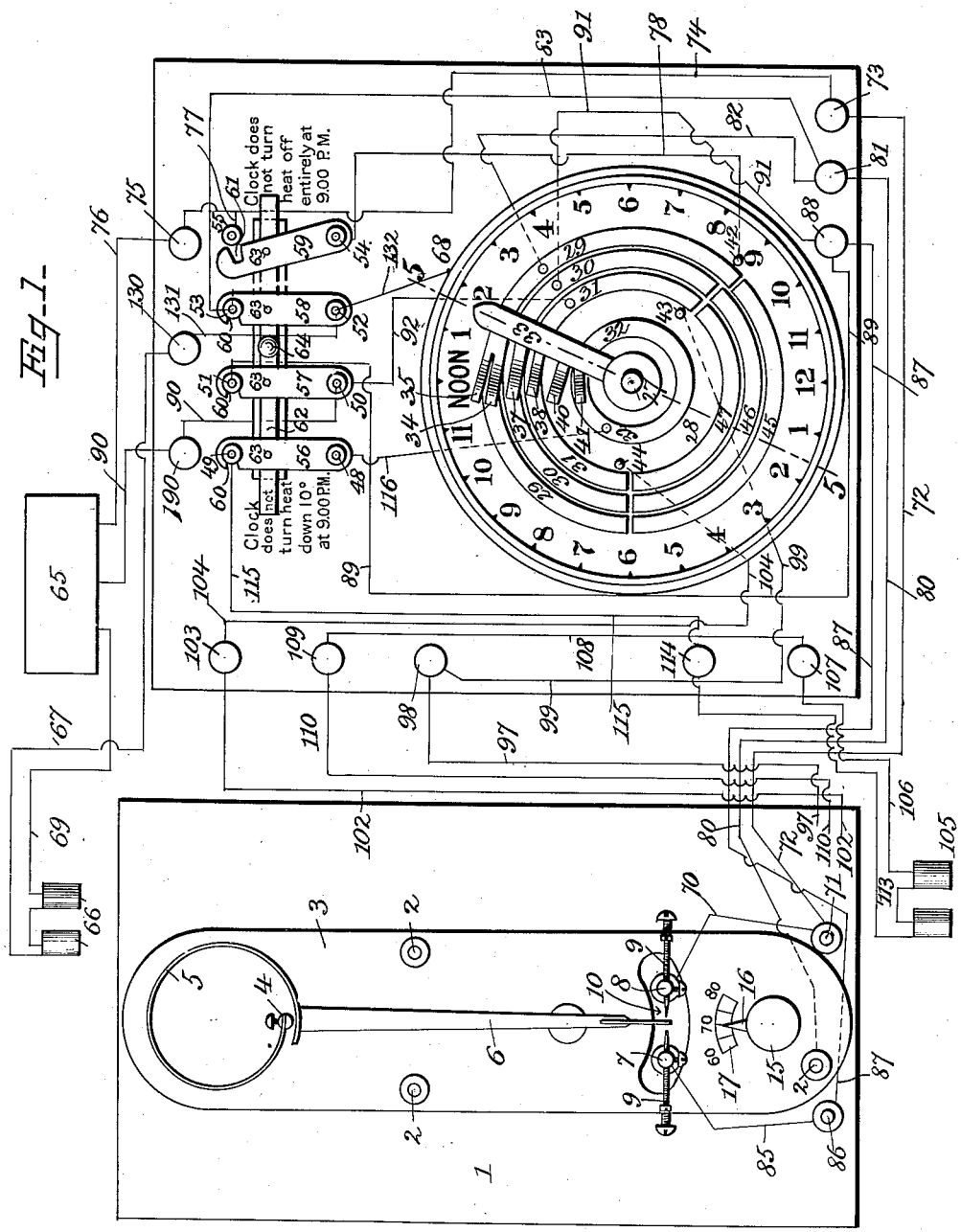
Witnesses
W. A. Williams.
Inventor
Frank A. Beckwith
By Dudley, Browne & Phelps,
Attorneys No. 848,280. PATENTED MAR. 26, 1907.
F. A. BECKWITH.
AUTOMATIC TEMPERATURE REGULATOR.
APPLICATION FILED AUG. 25, 1906.
5 SHEETS—SHEET 2.
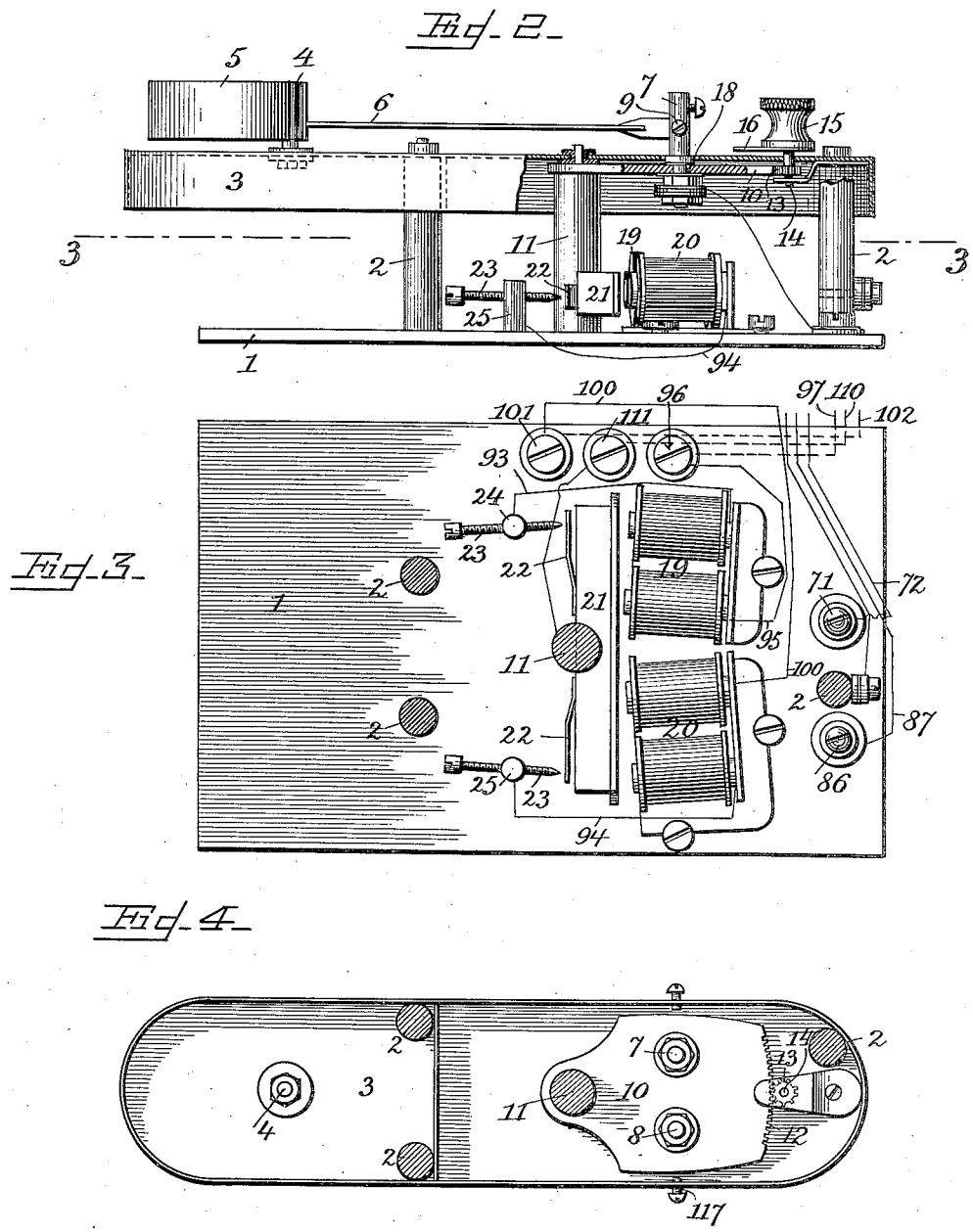

No. 848,280. PATENTED MAR. 26, 1907.
F. A. BECKWITH.
AUTOMATIC TEMPERATURE REGULATOR.
APPLICATION FILED AUG. 25, 1906.

5 SHEETS—SHEET 3.

Witnesses
W. A. Williams

Inventor
Frank A. Beckwith
By Dudley, Brown & Phelps
Attorneys

No. 848,280. PATENTED MAR. 26, 1907.
F. A. BECKWITH.
AUTOMATIC TEMPERATURE REGULATOR.
APPLICATION FILED AUG. 25, 1906.

5 SHEETS—SHEET 4.

Witnesses
W. A. Williams

Inventor
Frank A. Beckwith.
By Dudley Brown & Phelps
Attorneys

No. 848,280. PATENTED MAR. 26, 1907.
F. A. BECKWITH.
AUTOMATIC TEMPERATURE REGULATOR.
APPLICATION FILED AUG. 25, 1906.
5 SHEETS—SHEET 5.
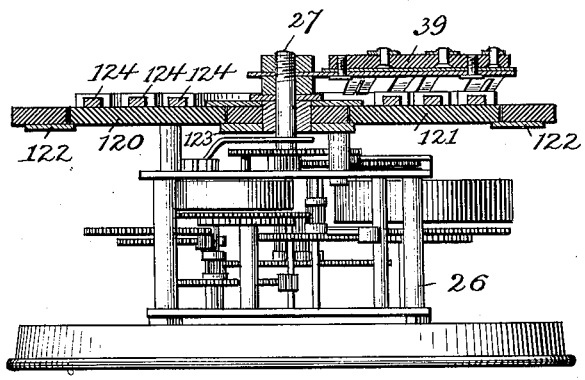
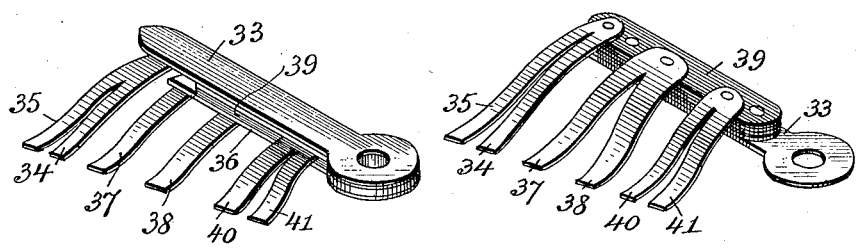
Witnesses
W. A. Williams.
Inventor
Frank A. Beckwith
By Dudley, Browne & Phelps
Attorneys

UNITED STATES PATENT OFFICE.

FRANK A. BECKWITH, OF EVANSTON, WYOMING, ASSIGNOR OF ONE-THIRD TO RUDOLPH DUMBECK, OF SALT LAKE CITY, UTAH.

AUTOMATIC TEMPERATURE-REGULATOR.

No. 848,280.    Specification of Letters Patent.    Patented March 26, 1907.

Application filed August 25, 1906. Serial No. 331,978.

*To all whom it may concern:*

Be it known that I, FRANK A. BECKWITH, a citizen of the United States, residing at Evanston, in the county of Unita and State of Wyoming, have invented certain new and useful Improvements in Automatic Temperature-Regulators; and I do hereby declare the following to be a full, clear, and exact description of the invention, such as will enable others skilled in the art to which it appertains to make and use the same.

My invention relates to certain new and useful improvements in automatic temperature-regulators.

The object of my invention is to provide a means whereby the temperature can be so regulated as to cause the temperature to be maintained at a certain degree of heat during one portion of the twenty-four hours and at a different degree of heat during the other portion of the twenty-four hours, the change being effected automatically by a time-controlled mechanism.

With this object in view my invention consists in a thermostat adapted to control the dampers of a furnace or valve of a steam or other heat-supplying pipe or main and a means under the control of a time mechanism which will cause the thermostat to so operate the dampers or valve as to keep the heat at one temperature during a portion of the twenty-four hours of the day and at a different temperature the remaining portion of the twenty-four hours.

My invention also consists in certain parts and combinations, the preferred form of which will be first described in connection with the accompanying drawings and then the invention particularly pointed out in the appended claims.

Figure 5:
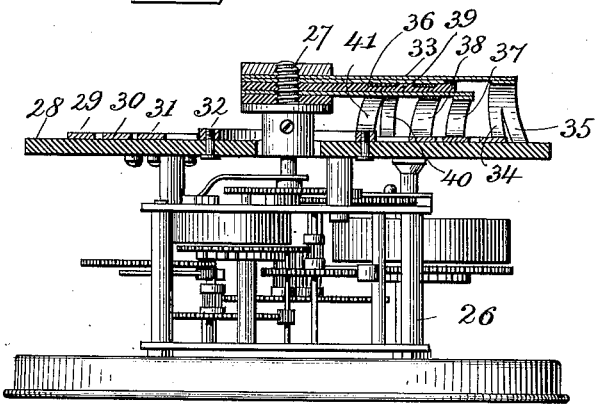
Figure 6:
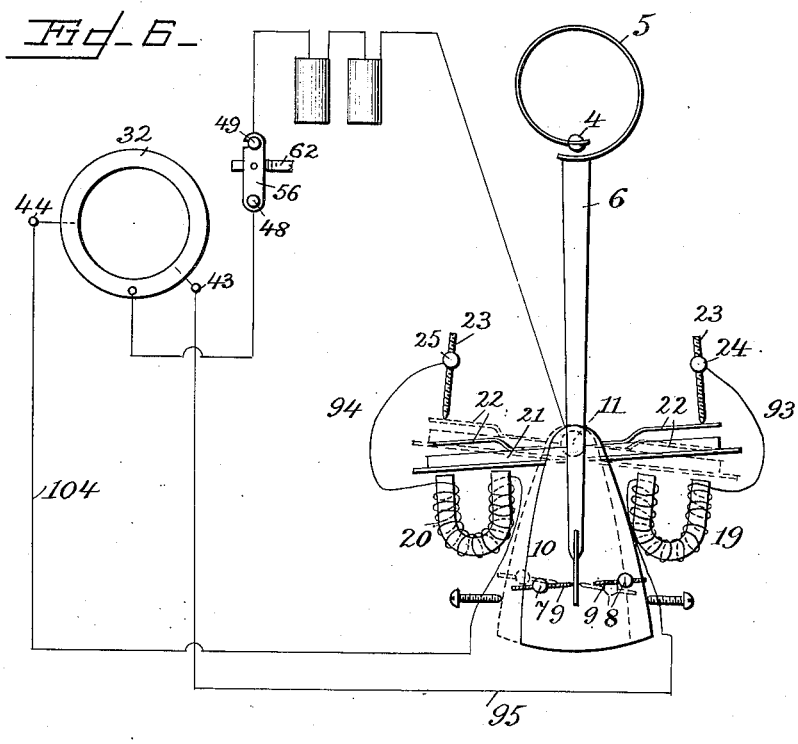
Figure 7:
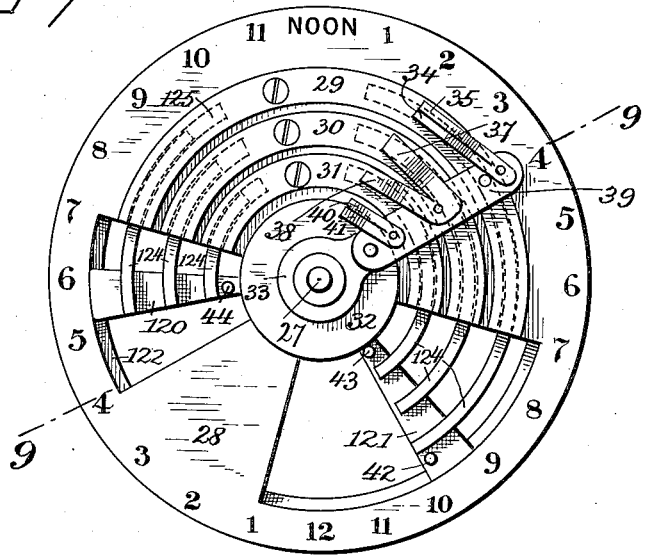
Figure 8:
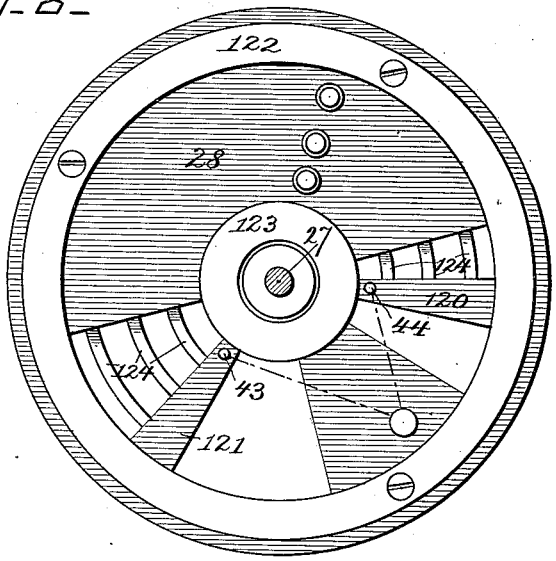

Referring to the drawings, wherein I show the preferred form of my invention and wherein the same part is designated by the same reference-numeral wherever it occurs, Figure 1 is a diagrammatic plan view of a thermostat and a time-controlling mechanism for the thermostat, showing also the circuits by which the thermostat is controlled and showing the circuits and motor controlled by the thermostat. Fig. 2 is a central longitudinal section of one form of thermostat which I may use in connection with my invention. Fig. 3 is a section on line 3 3 of Fig. 2 looking downward. Fig. 4 is a section on line 3 3 of Fig. 2 looking upward. Fig. 5 is a section taken on line 5 5 of Fig. 1. Fig. 6 is a diagrammatic view showing the controlling mechanism for the thermostat. Fig. 7 is a front view of a modified form of the clock-operated mechanism for controlling the thermostat. Fig. 8 is a diagrammatic view of Fig. 7, showing the circuits of the clock-operated mechanism. Fig. 9 is a section taken on line 9 9 of Fig. 7. Fig. 10 shows the perspective views of the contact-arm.

In the following description I will first describe the thermsotat and its controlling mechanism, then the clock-operated mechanism for controlling the thermostat, and finally the circuits and the operation of the entire device.

1 designates a base-plate which preferably is formed of vulcanite or other suitable insulating material, from which extends the supporting-posts 2 2.

3 designates a plate supported on the upper ends of the posts 2.

4 designates a post on the plate 3 and on which is supported one end of a suitable thermostat, formed in the construction shown by a coil 5.

6 designates an arm which extends outwardly from the free end of the coil, the free end of the arm extending between the pair of posts 7 8, provided with set-screws 9 9, the inner ends of the screws standing in line with the free end of the arm 6. Any increase in temperature causes the coil 5 to expand and move the free end of the arm 6 in the form of construction shown to the right, whereas any fall in temperature causes the coil to contract and move the free end of the arm 6 toward the left. This causes the arm to oscillate under the influence of changes of temperature between the screws 9 in the posts 7 and 8 and into contact first with one screw and then the other.

10 designates a plate pivoted on the under face of the plate 3 by being supported between the under surface of the plate and the top of a post 11, the plate being fast on the post 11, which is pivoted between the base 1 and the plate 3 and insulated from the plate. The plate 10 on its side opposite the post 11 is provided with a rack 12, with which engages a gear 13, fast on a shaft 14, extending through the plate 3, the shaft being provided on its upper end with an operating-knob 15, the knob preferably carrying a pointer 16, operating over a scale 17. To the plate 10 are secured the posts 7 and 8, the posts being insulated from the plate by means of the insulating-washers 18, of mica or other suitable material. The thermostat above described is an ordinary well-known type of thermostat, and its construction forms no part of my invention.

19 20 designate two electromagnets which are secured to the base 1, and 21 is an armature for these magnets carried on the post 11, the armature being secured to the post at its middle portion and the magnets being so arranged that when one of the magnets is energized the post will be oscillated in one direction and when the other magnet is energized the post will be oscillated in the other direction. As the plate 10, carrying the posts 7 and 8, is secured to the post 11, this will cause the posts 7 and 8 to move toward and away from the free end of the arm of the thermostat and cause the heat-controlling mechanism to operate at different temperatures.

22 22 are spring-arms mounted on the rear side of the armature 21 and adapted to make contact alternately with set-screws 23 23, carried by posts 24 and 25.

26 designates a clock mechanism of the ordinary type, except that it is so geared as to cause the shaft 27 to make one revolution in twenty-four hours.

28 is a plate, preferably formed of vulcanite or other suitable insulating material, supported upon the front of the clock and through which the shaft 27 passes. This plate carries a series of segmental rings 29, 30, and 31, located concentrically to each other and separated from each other. Within the segmental rings 29, 30, and 31 there is located a complete ring 32.

33 designates an arm secured to the end of the shaft 27 and carrying at its outer end a pair of fingers 34 35, shown as being formed by splitting a single finger. The fingers 34 35 and arm 33 are preferably formed of metal, as it is necessary that they be in electric connection with the shaft 27.

36 designates a second arm, which at its outer end carries the contact-fingers 37 and 38. This arm is insulated from the shaft 27 and the arm 33.

39 is a block of insulating material secured to the arm 36, and in this block is supported a pair of contact-fingers 40 and 41.

The fingers 34 35 are connected together. The fingers 37 38 are connected together, and the fingers 40 41 are connected together, making three sets of contact-fingers. The finger 35 extends outside the segmental ring 29 and is adapted to contact with a post 42. The finger 34 runs in contact with the segment 29. The finger 37 runs in contact with the segment 30. The finger 38 runs in contact with the segment 31. The finger 40 is adapted to contact with a pair of posts 43 44, respectively, during the course of its travel, and the finger 41 is adapted to run in contact with the ring 32.

In the form of my invention shown in Figs. 1 to 6, inclusive, the time-operated mechanism is adapted to control the thermostat so as to increase the heat at six a. m. and decrease the heat at nine p. m. The segmental rings 29, 30, and 31 consequently extend from the portion of the dial 28 corresponding to six a. m. to the portion corresponding to nine p. m. The posts 42 and 43 are in position to be in contact with their fingers at nine p. m., while the post 44 is in position to be in contact with the finger 40 at six a. m. In the form of construction shown in Fig. 1 45, 46, and 47 are segmental rings corresponding to 29, 30, and 31, which extend between the ends of the segments 29, 30, and 31 to complete the circle. The rings 45, 46, and 47 are, however, merely blanks and have no electrical connection with any part of the mechanism and are merely for the purpose of supporting the fingers and causing them to run smoothly during the whole of their revolution.

48 49, 50 51, 52 53, 54 55 are pairs of posts, and 56 is a bar pivoted on the post 48. 57 is a bar pivoted on the post 50. 58 is a bar pivoted on the post 52, and 59 is a bar pivoted on the post 54. The bars 56, 57, and 58 are each provided with a notch 60, extending in one direction, and the bar 59 is provided with a notch 61, which extends in the opposite direction from the notches 60 in the bars 56, 57, and 58. These notches are adapted to engage with the posts 49, 51, 53, and 55, respectively. 62 is a bar connected to the bars 56, 57, 58, and 59 by pivots 63, and 64 is an operating-handle secured to the bar 62. The bar 62 is preferably formed of some insulating material, such as vulcanite, though it may be formed of metal with the bars 56, 57, 58, and 59 insulated therefrom. By this construction all the bars 56, 57, 58, and 59 are caused to move simultaneously, and these bars are so connected to the bar 62 that when the bars 56, 57, and 58 are in contact with the posts 49, 51, and 53 the bar 59 will be out of contact with the post 55 and when the bar 59 is in contact with its post 55 the other bars will be out of contact. These bars and posts form switches by which the operation of the mechanism may be changed, so as to cut out the clock-operated mechanism from the thermostat, if desired, in a manner to be hereinafter more fully described, wherein by reason of the wiring with one throw of the switch post 42 is thrown out of contact, while a path independent of the segmental rings is made for the current, so that the thermostat may operate during the full twenty-four hours, and bar 56 from 48 to 49 makes a circuit for the current controlling the electromagnets to shift thermostat regulation up or down a given number of degrees. With the reverse throw of the switch bar 56 from 48 to 49 is out of contact, post 42 is in contact, and the shunt-path before opened independent of the segmental rings is broken, and the only path for current to flow is through segmental rings and fingers on bar or arm 33. Consequently current may flow by control of thermostat only during those hours covered by segmental rings and is out entirely from nine p. m. to six a. m. The various shunt-wirings are more fully described hereinafter.

The bar 62 is so arranged in reference and combination with two indicating-plates, which may be made of metal with lettering stamped thereon or may be made of other suitable material with proper lettering that with one throw of the switch the bar 62 covers the word "not" on the indicating-plate on one side and exposes it to be read on the other side. With the reverse throw of the switch the word "not," previously covered, is exposed to be read, and the word "not" in the opposite indicating-plate, previously exposed, is covered.

The indicating-plate on one side reading "Clock does not turn heat off entirely at 9 P. M." and the opposite indicating-plate reading "Clock does not turn heat down 10 degrees at 9 P. M.," and the words "not" on each indicating-plate being so placed and situated in reference to the opposite ends of the bar 62 that the end of the bar 62 covers from reading a word "not" on one indicating-plate while exposing it for reading on the other alternately with the throw of the switch, by this means indicating from the reading exposed to view that with one throw of the switch "Clock does (    ) turn heat down 10 degrees at 9 P. M.," while the reverse plate reads "Clock does not turn heat off entirely at 9 P. M.," and with the reverse throw of the switch the indicating-plates would read "Clock does not turn heat down 10 degrees at 9 P. M.," while the reverse plate would read "Clock does (    ) turn heat off entirely at 9 P. M." It will thus be seen that each throw of the switch by varying the wiring connections gives a separate function to the clock-controlling mechanism, which is more fully described hereinafter.

65 designates a motor by means of which the damper or steam-valve, as the case may be, are operated. This motor I have merely indicated on the drawings, as it forms no part of my present invention. For a description and illustration of a motor which may be used for this purpose see patent to Butz, No. 390,281, patented October 2, 1888.

I will now describe the wiring of the mechanism and by means of which the clock is caused to control the circuits between thermostat and motor and between the two electromagnets which vary the point of regulation of the thermostat, thereby effecting the desired results in each circuit for each function of the clock-controlling mechanism.

66 indicates the battery by which the motor 65 is operated. One side of this battery is connected by a wire 67 to the binding-post 130, thence by wire 131 to pivot 52. A wire 132 connects pivot 53 with the case of the clock at 68, from which point the current passes through the gearing to the central stud 27, thence by arm 33, which is carried in contact with 27, to fingers 34 and 35, finger 34 bearing on segment 29 and finger 35 placed so as to make contact with post 42 at nine p. m. The other side of the battery is connected by a wire 69 to one of the binding-posts on the motor 65. Pivot 53 is connected by a wire 83 to binding-post 81, 81 by wire 80 to post 2, which, as has been previously explained, is in electrical contact with post 4, thereby with coil 5 and arm 6 of thermostat, which by increase of temperature expands to set-screw in 8 and contracts to set-screw in 7. Wire 76 connects motor 65 with post 75, which post 75 is connected by a wire to pivot 55. Wire 74 connects pivot 55 to post 73. Wire 72 connects post 73 to post 71. Wire 70 connects post 71 with screw 8, containing set-screw 9, (right or off.) Wire 90 connects motor 65 with post 190, thence to pivot 50. Wire 92 connects pivot 50 with segment 31. Wire 89 connects pivot 51 with post 88. Wire 87 connects post 88 with post 86. Wire 85 connects post 86 to screw 7, containing screw 9, (left or on.) Wire 82 connects post 81 with segment 29. Wire 91 connects post 88 with segment 30. Wire 83 connects post 81 with pivot 53. Wire 78 connects post 42 (shut off) with pivot 54. A wire connects pivot 53 to case of clock on metal at 68, thence through gearing to central stud 27, and via arm 33 to fingers 34 and 35. The above completes the thermostat-circuits.

The following are the circuits from battery 105 through electromagnets 19 and 20: Battery 105 is connected by wire 106 to post 107. Wire 108 connects post 107 to post 109. Wire 110 connects post 109 with post 111, from which point a wire connects post 111 to post 11, carrying armature 21. The springs 22, carried on armature 21, alternately make contact with screws 23 in 24 and 25, as magnets 20 and 19 have been energized by contacts 40 to 44 and 40 to 43. Wire 93 connects 24 to one end of the winding on magnet 19, and wire 95 connects the other end of the winding on magnet 19 with post 96. Wire 94 connects one end of the winding on magnet 20 to 25, and wire 100 connects the other end of the winding on magnet 20 with post 101. Wire 102 connects post 101 with post 103. Wire 104 connects post 103 to post 44, corresponding to six a. m. Wire 97 connects post 96 with post 98. Wire 99 connects post 98 to post 43, corresponding to nine p. m. Wire 113 connects the other side of the battery 105 to post 114. Wire 115 connects post 114 to pivot 49, thence by bar 56 to pivot 48 (when switch-bar 56 is closed) and by wire 116 to ring 32. The above wiring completes the circuit from battery 105 through electromagnets 19 and 20.

Having described the wiring, I will now trace the path of the current when bar 6 expands to the screw in 8, with the switches shown in Fig. 1, wherein bars 56, 57, and 58 are closed into contact and bar 59 is broken from contact: Currents start at battery 66, via wire 67 to center binding-post to 52 and bar 58 being in contact thence to 53 without reference to wire to 68 or concentric rings, and thereby, by reason of bar 58 being in contact, a path is made for current after nine p. m. by wire 83 to 81, thence by wire 80 to post 2, which is in contact with post 4 and bar 6, to the screw in 8, thence by wire 70 to 71 post, thence by wire 72 to post 73, thence by wire 74 to pivot 55, but bar 59 being out of contact current cannot pass to 54, wire 78 to post 42, so that with throw of switch shown in Fig. 1 point 42 is not in circuit, from 55 to post 75, thence by wire 76 to motor 65 and back by wire 69 to battery 66, completing circuit. This circuit would be the shutting-off circuit, by reason of bar 6 having expanded with increase of temperature and thermostat operating to shut heat off.

I will now trace the current when bar 6, by reason of the previous contact just made, contracts now and touches point in 7, with switch-bars in same position 57 and 58 closed and 59 out of contact: Current starts at battery 66 along the circuit hereinbefore explained fully, via center binding-post, 52, 53, 83 wire to 81, to post 2, thence to bar 6, and bar 6 being contact to screw in 7, thence by wire 85 to post 86, thence by wire 87 to post 88, but bar 57 being closed from 50 to 51 circuit is established by wire 89 from post 88 to post 51, across bar 57 to pivot 50, thence by wire 90 to post 190, thence to motor 65 and by wire 69 back to battery 66, completing circuit. Wire 91 from post 88 to segment 30 would have circuit established across to segment 31 only during that portion of the twenty-four hours when arm 33 carrying contact-fingers 37 and 38 would be in contact with segments 30 and 31, or between the hours of six a. m. and nine p. m., so that if the time was later than nine p. m. and fingers 37 and 38 were out of contact the circuit would be broken between 30 and 31, and no current could pass on wire 92 from segment 31 to pivot 50, thence to 51; but in the position shown in Fig. 1 bar 57 establishes the circuit from 51 via 89 to 88, thence to 50, via 90 to motor 65, and the circuit broken after nine p. m. on wire 9 to segment 30, which after nine p. m. is out of contact with segment 31, thence by wire 92 to point 50, is established otherwise by the bar 57.

Having shown the circuit through thermostat in the position of the switches shown in Fig. 1, I will now trace the circuit from battery 105 through electromagnets operating by automatic varying of the temperature maintained by the thermostat, which from the foregoing explanation is seen to operate by reason of bars 57 and 58 being in contact throughout the full twenty-four hours. When arm 33 travels to the position corresponding to nine p. m., fingers 40 and 41 establish a circuit from ring 32 to point 43. In this position the path of the current is as follows: from battery 105 by wire 106 to post 107, by wire 108 to post 109, by wire 110 to post 111, thence by wire connection previously explained to 11 in contact with armature 21, which is in contact with springs 22 thereon, and magnet 20 having last operated at the previous six a. m. spring 22 is in contact with screw in 24, thence by wire 93 through magnet and out by wire 95 to post 96, thence by wire 97 to post 98, thence by wire 99 to post 43 and across fingers 40 and 41 to ring 32, thence by wire 116 to pivot 48, and bar 56 being closed into contact thence to pivot 49, thence by wire 115 to post 114, and thence by wire 113 back to battery 105, completing circuit, which having been established by fingers 40 and 41 at nine p. m. energizes magnet 19 and which draws down armature 21, shifting set-screws in 7 and 8, so that thermostat operates to hold temperature at a less degree until opposite magnet is energized at six a. m. following. The arm 33 proceeding in its travel, fingers 40 and 41 are brought into contact at six a. m. from ring 32 to post 44.

I will now trace the opposite circuit from the one last described: The current starting at the battery 105 passes by wire 106 to post 107, by wire 108 to post 109, by wire 110 to post 111, thence to 11 and armature carried on 11 to springs 22 22, carried on armature. Magnet 19 having last operated, contact is broken between 22 and 24, but is established between 22 and 25. Current passes from spring 22 to 25, thence by wire 94 into magnet 20, which is thus energized, out by wire 100 to post 101, thence by wire 102 to post 103, thence by wire 104 to post 44, corresponding to six a. m., which is now in circuit by fingers 40 and 41 to ring 32, thence by wire 116 to pivot 48, across bar 56, which is closed in contact in Fig. 1, to pivot 49, thence by wire 115 to post 114 and by wire 113 back to battery 105, completing circuit.

From the description given in tracing the thermostat-circuit hereinbefore it was shown that thermostat makes and establishes circuit by expansion and contraction during the whole twenty-four hours in the position of the switch shown in Fig. 1 and bar 56 being brought into contact when bars 57 and 58 are also in contact, that while bars 57 and 58 allow a path for the thermostat-circuit during the full twenty-four hours that bar 56 establishes a circuit which is completed at nine p. m. to shift armature on plate carrying posts 7 and 8 of thermostat, whereby magnet 19 is energized, and posts are changed in position automatically, so that thermostat operates on a less temperature, and at six a. m. the opposite circuit is established, whereby magnet 20 is energized and the plate carrying posts 7 and 8 is changed back to the proper and higher temperature during the hours six a. m. to nine p. m.

Having traced the circuits with bars 56, 57, and 58 closed into contact and bar 59 out of contact, I will now trace the circuits with the opposite throw of the switch and bars 56 57 out of contact and bar 59 closed into contact. Beginning first with the circuit from battery 105, it will be seen that bar 56 being out of contact no current may pass, and at nine p. m. electromagnet 19 is not energized, nor is electromagnet 20 energized at six a. m., and it will be hereinafter shown that valve or dampers will be closed at nine p. m. and all heat off and opened again at six a. m. The description of the indicating-plates hereinbefore given shows that with each throw of the switch the exposed portion of each plate reads what function the clock will perform for each throw of the switch. With bars 56, 57, and 58 out of contact and bar 59 in contact the circuit is as follows: Current starting at battery 66 passes by wire 67 to center binding-post, thence by wire to pivot 52; but bar 58 being out of contact the circuit from pivot 52 to 53 is broken, and wire 83 consequently receives no current. The current, however, will between six a. m. and nine p. m. pass from the pivot 52 through the wire 132 to the clock-case at 68, thence through the clock-gears to the clock-shaft 27, through the arm 33 to fingers 34 and 35, thence through segment 29 to wire 82, to post 81, by wire 80 to post 2, which is in contact with post 4 and arm 6, where, considering the thermostat to be expanding by increase of temperature, arm 6 expands to screw in 8 to shut heat off. Current continues by wire 70 from 8 to post 71, by wire 72 to post 73, by wire 74 to pivot 55, thence to post 75, and by wire 76 to motor 65 and back by wire 69 to battery 66, completing the circuit. Bar 59 being closed into contact places pivot 55 in circuit with pivot 54 and thence by wire 78 to post 42, which by this shunt connection will at all times when bar 59 is closed into contact establish a circuit at nine p. m. between 29 and 42, which is the same circuit as just traced, to shut off heat by closing damper or valve. Consequently when arm 33 by fingers 34 and 35 at nine p. m. establishes circuit from 29 to 42 the motor will operate to shut off heat, which operation has been indicated by the throw of the switch-closing bar 59 into contact, and indicating-plate reads, "Clock does ( ) turn heat off entirely at nine p. m.," while opposite indicating-plate reads, "Clock does not turn heat down 10 degrees at 9 p. m.," as bar 56, the electrical connections to which have been hereinbefore traced, is out of contact, and no current can pass through electromagnet-circuit.

Having traced the current for the shutting-off operation of motor, I will now trace current on same throw of switch, bars 56, 57, and 58 being out of contact and bar 59 being closed into contact, for the contraction of arm 6 of thermostat for the operation of motor to open dampers or steam-valve to turn heat on. Current starting at battery 66 passes, as previously shown, to center binding-post to pivot 52 and thence by circuit previously traced to 68 27 33 29 during hours of from six a. m. to nine p. m., but no circuit established after nine p. m. from 29, thence to 81 2 4 and arm 6, which is considered as having contracted, to screw in 7 to turn heat on, from screw 7 by wire 85 to post 86, by wire 87 to post 88. Wire 89 from post 88 to pivot 51 is out of circuit by bar 57 being out of contact, and pivot 51 is out of circuit with pivot 50. Hence wire 89 from post 88 bears no current, and current is passed by wire 91 from post 88 to segment 30, and from segment 30 circuit is established across to segment 31 by fingers 37 and 38 only during the hours corresponding to that portion of the dial covered by segments 30 and 31, or from six a. m. to nine p. m., after which time circuit is broken between 30 and 31, and as they are on the circuit operating the motor to turn heat on no heat can be turned off after nine p. m. From segment 31 current passes by wire 92 to pivot 50, thence by wire 90 to post 90 and to motor 65, from which it passes by wire 69 back to battery 66, completing circuit.

Segments 30 and 31 are shorter in length on the side corresponding to nine p. m. than segment 29 and position of post 42. Consequently arm 33 by fingers 34 and 35 remains in contact a short period of time after fingers 37 and 38 have passed out of contact with segments 30 and 31, and being out of contact current cannot pass through segments 30 and 31 to turn heat on by operation of motor; but contact is made during the further travel of arm 33 in a short period from 29 segment to post 42, because of the greater length of segment 29 and the further advanced relative position of post 42 from the ends of segments 30 and 31. Hence the motor cannot be operated to turn heat on at nine p. m. irrespective of position of arm 6 of thermostat, but is a short period after nine p. m. operated to shut heat off irrespective of position of arm 6 of thermostat. By this means motor is positively and automatically operated so as to turn heat off the last thing at nine p. m. as the arm 33 carries fingers 34 and 35 and 37 and 38 out of contact with the segmental rings on dial of clock, and such operation corresponds to the indicating-switch, which, for position of bar 59 closed into contact between pivots 54 and 55, reads "Clock does ( ) shut heat off entirely at 9 p. m." on one plate and reads "Clock does not turn heat down 10 degrees at 9 p. m." on the other plate, because of bar 56 being out of contact and electromagnet-circuit broken.

The function of the clock-controlling mechanism by reason of the various circuits and switch is twofold. With one throw of switch heat is entirely shut off by operation of motor 65 by circuits established, during which time the switch is so thrown, the automatic shifting of the electromagnets is out of circuit, while with the reverse throw of the switch heat may be supplied during the full twenty-four hours; but automatically from the form of my invention shown in Fig. 1 the thermostat is shifted at nine p. m. to supply heat for a lower regulated temperature and is automatically shifted back to the former higher regulated temperature at six a. m. to continue until the following nine p. m., the throw of the switch for each position exposing to be read which function the clock will control.

In Figs. 6 and 7 I have shown a modified form of the clock-operated structure by means of which the time at which the thermostat is changed or at which the time the thermostat is cut out from operating the motor may be varied. This I effect by providing means for varying the length of the segmental rings 29, 30, and 31 and at the same time so mounting the contact-posts 42, 43, and 44 that their position may be changed. In the form of construction illustrated in the drawings I effect this by cutting away the portion of the clock-face between seven a. m., counting backward to seven p. m., just outside the line of the outer circumference of the segmental ring 29. In the cut-away portion so formed I mount a pair of sector-shaped segments 120 121, the segments resting upon an inwardly-projecting ledge 122 and an outwardly-projecting ledge 123. 124 are arc-shaped projections which extend from the sides of the segments 120 121 and which are adapted to enter guide-slots 125, formed in the rings 29, 30, and 31, respectively. The segment 121 carries the contact-posts 42 and 43, while the segment 120 carries the contact-post 44. The position of the segments 120 121 can be adjusted, as will be readily understood, and by the adjustment the length of time that the fingers carried on the rotating arm are in contact with the rings 29, 30, and 31 and their extensions formed by the projections 124 can be varied. The position of the segments also determines the time when the fingers come in contact with the posts 42, 43, and 44. In the form of construction shown the device may be set so as to operate any time between four and six o'clock in the morning and between eight and ten o'clock at night, as may be desired.

In the drawings, by means of which I have illustrated my invention, I have not shown the furnace and dampers or the steam-valve, as the case may be, which are operated by the motor 65, as this construction is old and well known. I have also not illustrated the parts of my apparatus as they would appear in actual use. In actual use the motor 65 and the batteries are preferably located adjacent to the furnace. The thermostat is preferably located in a portion of the house where a mean temperature is obtained, and the clock may be located adjacent to the thermostat or any other convenient locality. I have in the drawings illustrated these parts as adjacent to each other in order to simplify the illustration thereof.

In the foregoing description I have described what I believe to be the preferred form of my invention. I desire to have it understood, however, that the particular form in which my invention is shown and which I have described merely illustrates one form of my invention, and many changes may be made in the form, construction, and arrangement of parts without departing from the spirit of my invention.

Having thus described my invention, what I claim as new, and desire to secure by Letters Patent, is—

1. In a temperature-regulating system, the combination with means for maintaining an unvaried predetermined temperature for a predetermined period of time, including a thermostat, and means for periodically and automatically adjusting the thermostat to cause subsequent automatic and successive variations of temperature at the expiration of successive predetermined periods of time.

2. In a temperature-regulating system, the combination with means for maintaining a predetermined temperature, including a thermostat, of means for automatically and periodically adjusting said thermostat to cause it to maintain a different temperature.

3. In a temperature-regulating system, the combination with means for maintaining a predetermined temperature for a predetermined time, including a thermostat, and means for automatically and periodically adjusting said thermostat to cause it to maintain a different temperature during another period of time.

4. In a temperature-regulating system, the combination with means for controlling the temperature including a thermostat, of means for periodically and automatically adjusting the thermostat to cause the temperature to be changed from a higher to a lower degree and vice versa.

5. In a temperature-regulating system, the combination with means including a thermostat for maintaining a desired degree of temperature during a predetermined period of time, and automatic means for causing successive variations of temperature at predetermined intervals of time.

6. In a temperature-regulating system, the combination with means including a thermostat for maintaining a desired degree of temperature during a predetermined period of time and automatic means for causing successive variations of temperature of predetermined amount at predetermined times.

7. In a temperature-regulating system, the combination with means for controlling the temperature including a thermostat said thermostat comprising an arm adapted to oscillate under variations of temperature, a pair of posts between which the arm is adapted to oscillate and with each of which the arm may make contact, means for varying the position of the posts in relation to the arm, a clock mechanism and means operated by said clock mechanism for automatically changing the position of the posts periodically, whereby the temperature is changed from a higher to a lower degree and vice versa.

8. In a temperature-regulating system, the combination with means for controlling the temperature including a thermostat comprising an arm adapted to oscillate under variations of temperature, a pair of posts between which the arm is adapted to oscillate and with each of which the arm may make contact and means whereby the contact of the arm with one post will raise the temperature and with the other post will lower the temperature, means for varying the position of the posts, said means including an armature and a pair of electromagnets, one of said electromagnets being adapted to move the posts in one direction, the other electromagnet to move the posts in the other direction, a clock mechanism and circuit connections between said clock mechanism and said electromagnets, whereby said electromagnets can be alternately operated to change the position of the posts in relation to the thermostatic arm.

9. In a temperature-regulating system, the combination with a thermostat and means under the control of the thermostat for regulating the temperature, of a clock mechanism, circuit-changing devices under the control of the clock mechanism, circuit connections between the circuit-changing devices and the thermostat whereby the changes in the circuit will cause the temperature to be changed from a higher to a lower degree and vice versa.

In testimony whereof I affix my signature in presence of two witnesses.

FRANK A. BECKWITH.

Witnesses:
JOHN R. ARNOLD,
F. W. BECKWITH.